United States Patent [19]

Fisher et al.

[11] 4,145,447

[45] Mar. 20, 1979

[54] HIGHLY COMPACTED ANIMAL FOOD SYSTEM

[75] Inventors: Stanton E. Fisher, 16 Brentmoor Park, Clayton, Mo. 63105; Bernard W. Weinrich, St. Charles, Mo.

[73] Assignee: Stanton E. Fisher, St. Louis, Mo. by said Bernard W. Weinrich

[21] Appl. No.: 343,835

[22] Filed: Mar. 22, 1973

[51] Int. Cl.² ............................................. A23K 1/175
[52] U.S. Cl. ........................................ 426/72; 426/74; 426/635; 426/516; 426/523; 426/805; 426/456
[58] Field of Search ............... 426/455, 456, 459, 460, 426/462, 463, 513, 516, 635, 523, 658, 512, 96, 443, 444, 454, 465, 805, 72, 74

[56] References Cited

U.S. PATENT DOCUMENTS

| | | | |
|---|---|---|---|
| 2,365,890 | 12/1944 | McBean | 426/456 |
| 2,505,407 | 4/1950 | Johnson | 426/463 |
| 3,013,880 | 12/1961 | King | 426/454 |
| 3,385,715 | 5/1968 | Ishler | 426/454 |
| 3,458,321 | 7/1969 | Reinhart | 426/463 |
| 3,574,632 | 4/1971 | Lanz | 426/455 |
| 3,642,489 | 2/1972 | Bartley | 426/516 |
| 3,653,908 | 4/1972 | Buck | 426/516 |
| 3,778,522 | 12/1973 | Strommer | 426/516 |
| 3,806,610 | 4/1974 | Rahman | 426/512 |

OTHER PUBLICATIONS

Webster's New World Dictionary, College Ed., World Publishing Co., N.Y., 1966, p. 324.

*Primary Examiner*—Hiram H. Bernstein
*Attorney, Agent, or Firm*—Sidney B. Ring; Hyman F. Glass

[57] ABSTRACT

This invention relates to unitized, compact, chew-resistant products with or without structure-supporting fibers. These products are prepared from animal foods which are preferably in a dry, shelf-stable form such as dried meals, dried fish, dried dairy products, fish meal, fish flour, cereals, flours, carbohydrates, dried fruits, etc., with or without food additives or supplements such as vitamins, minerals, medicinals, etc., for example chemicals, enzymes, etc., capable of removing plaque or tartar frm the animal's teeth, etc. These products are prepared by:

(1) Adding sufficient water to wet the product without affecting its free flowing character;

(2) Compacting the wetted product at high pressure;

(3) Baking the product.

24 Claims, No Drawings

HIGHLY COMPACTED ANIMAL FOOD SYSTEM

This invention relates to a pet feeding system.

Many pet foods are available on the market. These include canned foods, dehydrated foods, etc. The moisture content of these foods is in the extreme ranges, i.e., the food is either very dry requiring the addition of water or it has a high moisture content. Since both types of food have little, if any, unit integrity, such food requires containers. In addition most pet foods are so soft that the animal can "wolf" them down without much chewing so that the animal's jaws and teeth get little exercise.

In patent applications Ser. No. 117,081 filed Feb. 19, 1971, Ser. No. 221,031 filed Jan. 26, 1973, and in Ser. No. 242,428 filed Apr. 10, 1972 there are described and claimed a unitized animal feeding product comprising animal food containing sufficient structure-supporting fibers therein to yield a chew-resistance product. By controlling the type and amount of fibers one controls the hardness and thus the chew resistance of the product. In comparison it was stated in these patent applications that "When the food is compacted to form a molded product without fibers, the resulting product is crumbly, i.e., it disintegrates with little chewing action."

We have now discovered that when wetted animal food is compacted under sufficient pressure, with or without fibers, and baked a hard, chew-resistant unitized product is obtained. Although the product containing fibers is generally more chew-resistant than the product without fibers, the product without fibers has sufficiently chew-resistance to yield an excellent product. For optimum results the compacted unitized animal food is then heated, such as by baking, to yield the optimum product.

One method of obtaining elevated pressure in the preparation of these hard, chew-resistant, unitized products, is by high pressure extrusion.

In general, the process is carried out as follows. The dry components are mixed until homogenous and sufficient water is added to wet the product without affecting the apparent dry free flowing characteristic of the product. In general, the amount of water added is that amount sufficient to wet without soaking the product. If too little water is employed the product will not be sufficiently chew-resistant. If too much water is employed, the product will be too wet and more difficult to dry out on heating and also less chew-resistant. In general the amount of water employed is at least about 7.5% of the dry components, such as from about 7.5–20%, but preferably from about 10–18% with an optimum of about 12 to 15% by weight.

The wetted product is then compacted at high pressure for a sufficient time to yield a product of the desired compactness. A convenient method of doing this is by high pressure extrusion so that the wetted particles are well compacted. The compacted, extruded product is then cut into suitable lengths and heated, preferably by baking, to yield a hard, unitized compacted dog food. A convenient method of obtaining pressure-time relationship is to control the residence time in the compacting area of the extruder or other pressure device.

The pressure employed in compacting the wetted components is at least about 100 psi, such as from about 100 to 100,000 psi, for example from about 300 to 25,000 psi, but preferably from about 400 to 8,000 psi with an optimum of about 600 to 1,200 psi. In general, the pressure and the time during which pressure is applied should be sufficient to compact the particles as closely as possible so that upon baking a chew-resistant product is obtained.

Heating or baking is carried out at a temperature sufficiently high to yield the desired product such as at least about 200° F., such as about 200°–350° F., preferably from about 250° to 325° F. with an optimum of 290° to 310° F.

The time of baking will vary with the temperature such as at least about 0.5 hr., such as from about 1 to 10 hrs., for example from about 1.5 to 7.5 hrs., but preferably from about 2 to 5 hrs. with an optimum of about 2 to 3 hrs.

Baking can be effected by either a batch type as well as a continuous process.

In heating or baking the product, the brittleness of the product is controlled by the final water content. In general, if the final water content is too low, the product is relatively brittle. In practice the final water content is at least about 5.5% by weight, such as from about 5.5–9.5%, but preferably from about 6–8% with an optimum of about 7.

The product of this invention is extremely dense. For example, it has a density of at least 0.5, such as from about 0.5–0.8 oz./in$^3$, preferably from about 0.6–0.75 oz./in$^3$ with an optimum of about 0.7 oz./in$^3$.

By tests, a bar of the product having the dimensions 1¼ in. × 1¼ in. × 5 in. possesses such hardness and density and chew-resistance that takes a 25 lb. dog from about 30 minutes to 2 hours to consume the product. Such chewing helps reduce tartar on the dog's teeth.

When the product having the dimensions of 1¼ in. × 1¼ in. ×5 in. is placed in a fixed position and a uniform force is gradually applied at its midpoint, a breaking force of at least about 60 psi is required, such as at least about 200 psi, but preferably at least about 300 psi with an optimum of at least about 500–800 psi.

In order to achieve optimum properties, particularly with those products without fibers, the product has the following parameters:

| Property | Broad Range about | Preferred Range about | Optimum Range About |
|---|---|---|---|
| Initial Water Content % | 7.45–20 | 10–18 | 12–15 |
| Extrusion Pressure psi | 100–100,000 | 400–8,000 | 600–1,200 |
| Baking Temperature ° F. | 200–350 | 250–325 | 290–310 |
| Baking Time Hrs. | 1–10 | 2–5 | 2–3 |
| Final Water Content % | 5.5–9.5 | 6.0–8.0 | 7 |
| Density oz./in$^3$ | 0.5–0.8 | 0.6–0.75 | 500–0.7 |
| Breaking Force psi | > 60 | > 300 | > 800 |

The invention is in essence characterized by a chew-resistant, compacted, self-contained unit which contains the pet's meal. The size and shape will depend upon many factors, such as the size of the dog, the amount of food required for the feeding, etc. For example, the size could be that required for a meal or increments thereof. The shape will depend upon the desired appearance, for example, the shape of a bone, a ball, a ring, an animal, a human, a stick, or any other imaginative, abstract, whimsical, amorphous or actual shape. Shapes are illustrated in the following patents: U.S. Pat. No. 3,104,648, Design Pat. Nos. 202,330, 202,331, 202,332, 207,167, etc.

In general, it is desirable that the components have a satisfactory shelf life so that preservation is no problem. These include many of the foods currently available such as air dried, freeze-dried, irradiated, etc., foods, such as meat, fish, fish meal, cereals, fruits, vegetables, wheat germ, protein flours derived from soya, fish, fish meal, dairy products, etc. Many of these are currently available commercially under a wide variety of names.

In addition, any desired vitamins, proteins, food additives, medicines or supplements, minerals, etc., can be added.

The invention can be carried out with or without fibers. This section describes the type of fibers that can be employed.

Any suitable structure-supporting fiber can be employed in this invention provided it performs the function of binding the food into a unitized chew-resistant product and is not harmful to the pet. This includes fibers which may or may not be digested by the animal, provided the pet's digestive system is capable of handling such fibers. For example, although cellulosic fibers are not digested by the pet, the pet's digestive system is capable of handling such fibers by passing them through his system substantially unchanged. In fact cellulosic figers provide increased roughage and bulk to the food so as to assist the pet in the digestion of food.

Examples of digestable fibers are collagen fibers. These include both collagen fibers which are obtained from hides as well as collagen fibers which are prepared by dissolving protein and then precipitating the protein from solution and aligning the molecules so as to obtain a fibrous material.

Protein fibers are derived from soy protein, egg white, wheat gluten, etc. The fibrous form of these proteins are spun into continuous aligned filaments to yield food forms which simulate the fiber of natural beef. Examples thereof are disclosed in Belgian Pat. No. 634,140, U.S. Pat. Nos. 3,071,477 and 3,197,130 and Cereal Chem 43 (2) 195 (1966). Animal protein such as animal collagen may also be dissolved, precipitated and aligned to yield reconstituted collagen.

A suitable source of structure-supporting fibers includes fibers derived from animal tissue — for example from the skin, muscles, intestines, etc., of animals, for example, from tendons, animal hides such as cowhide, rawhide, etc.

One convenient method of preparing animal fibers is to cut, chip, grind, shred, shear, beat, etc., animal skins such as cowhide, rawhide, etc., or by combinations of these operations to yield collagen fibers which can be incorporated into the molded food to enhance its unit integrity.

The amount of animal hides used as a source of collagen to be added to the molded product will depend upon many factors, such as for example, the type and amounts of fibers present in the hide, the type of subdivision of the hide, the type of food in the product, whether swollen or unswollen collagen or hide binders or gels are employed, etc.

Collagen is a protein forming the chief constituent of connective tissue. In animal hide collagen constitutes the bulk of the fibrous protein, and for purposes of this invention is meant to include other fibrous protein such as elastin, reticulin, etc. Since hides contain collagenous fiber bundles, cutting, chopping, shredding, shearing, etc., divide these bundles into smaller sections. When work is performed on these cut segments, the smaller fibers are spread out over wider areas. Theoretically in the preparation of the product of this invention, the bundles of fibers are broken and then realigned so as to form fiber interlocks. To obtain maximum strength the cut fibers reinterlock in the final product so that a continuous fiber bond is formed to maintain the strength of the final product in the nature of a realigned fiber weave. In general, one places sufficient collagen fibers in the product to impart the desired properties in the final product.

In general, the percent by weight of fibers such as animal hide or other forms of collagen in the food product comprises up to about 50% or more, such as from about 0.5-40%, for example from about 1-30%, such as from about 1-10%, but preferably from about 1-5%. The optimum amount will depend on various factors such as the thickness, length, etc., of the fibers, the desired chew-life, etc.

Since collagen is a digestible protein, it not only maintains the unit integrity of the product, but also enhances its food value. Thus, collagen is a protein supplement increasing the protein value of the food.

The following Example illustrates a method of preparing fibrous collagens from hides.

EXAMPLE A

Essentially, the process employs cutters and shearing devices. The hide is cut into fiber bundles and the bundles sheared into fibers.

Hides are limed, fleshed, washed and adjusted to optimum pH. Pretreated hides are conveyed to a cutter that exerts a scissor-like action. From the cutter, the material is conveyed to a comminuating machine with openings in the cutting heads ranging from ¾ to 3/64 in. This machine controls the fiber length.

In addition to employing undigested collagen fibers, digested or partially digested collagens or mixtures thereof can also be incorporated into the molded foods.

Cowhide can be digested by treating comminuated limed cowhide in dilute acid in the presence of a proteolytic enzyme such as for example: alpha-amylase, bromelin, ficin, pancreatin, papain, pepsin, steapin, trypsin, etc., so as to yield swollen collagen. The collagen can be incorporated into the food product and hardened therein. Both digested and undigested fibers can be employed. In addition, completely digested cowhide in the form of hide binder or gelatin, partially digested cowhides such as swollen collagens, and undigested hides can be incorporated into the food. Hides may also be beaten or sheared to loosen the collagen and fiber structure and these fibers separated and incorporated into the food.

The following illustrates a general procedure for carrying out the invention:

A compact animal food is prepared by mixing the following: (1) Ingredients containing adequate nutrition, (2) adding a sufficient amount of water thereto so as to wet the system without affecting its free flowing state; (3) compacting this product at high pressure such as by molding or extruding; and (4) baking the product. This product has extended chew life and is beneficial for exercising the teeth and gums of the animal.

The above general formulation can be improved by adding one or more of the following:

(a) protein rich materials such as soybean flour, etc.
(b) a carbohydrate rich material such as dried corn syrup, etc.
(c) a fat rich material such as tallow, etc.
(d) food supplements such as minerals, vitamins, enzymes, etc.

This invention is illustrated by the following specific examples which are presented for purposes of illustration and not of limitation.

EXAMPLE 1

A compact animal food is prepared by mixing 100 lbs. of ingredients* with about 6 liters of water. After addition of the water, the mixture is still free flowing.

*The ingredients have the following analysis:

The wetted ingredients* are extruded at a pressure of about 1,000 psi.

The extruded product is cut into suitable lengths and placed on open racks and oven baked at 300° F. for about 3 hrs. The product on cooling is a compact, hard product having high chew life or unit integrity when eaten by dogs.

| | |
|---|---|
| Crude Protein, not less than | 23.0% |
| Crude Fat, not less than | 9.0% |
| Crude Fiber, not more than | 5.0% |
| Moisture, not more than | 10.0% |

It was made from the following ingredients: Ground Corn, Soybean Meal, Wheat Red Dog, Meat Meal, Animal Fat, (preserved with BHA), Dried Tomato Pomace, Salt, Dicalcium Phosphate, Sodium Carboxymethyl Cellulose, Artificial Coloring, Vitamin A Palmitate, D-activated Animal Sterol (source of Vitamin $D_3$), Riboflavin Supplement, Niacin, Choline Chloride, Vitamin $B_{12}$ Supplement, Vitamin E Supplement, Pyridoxine Hydrochloride, Thiamine Hydrochloride, Potassium Chloride, Magnesium Oxide, Calcium Carbonate, Manganese Sulphate, Iron Sulphate, Iron Carbonate, Iron Oxide, Potassium Iodide, Zinc Sulphate, Cobalt Sulphate, Copper Oxide and Ethylene Diamine Dihydriodide.

EXAMPLE 2

70 lbs. of ingredients* are mixed with 15 lbs. of soya flour and 15 lbs. of dried corn syrup, sufficient vitamin and mineral supplements to yield a balanced diet** and about 3 lbs. of refined beef tallow.

**The supplement employed had the following vitamin content:

The ingredients are blended until homogenous and about 6 liters of water are added to the mixture while stirring at 160° F. After addition of the water the mixture is still free flowing. The mixture is extruded at a pressure of about 1,000 psi.

| | |
|---|---|
| Vitamin A | 30,000 USP units per lb. |
| Vitamin $D_2$ | 20,000 USP units per lb. |
| Vitamin E | 50 IU units per lb. |
| Thiamine | 40 mg per lb. |
| Riboflavin | 27 mg per lb. |
| Niacin | 250 mg per lb. |
| Chloline Chloride | 1250 mg per lb. |
| Vitamin $B_{12}$ | 100 mg per lb. |
| Pyridoxine | 20 mg per lb. |

The extruded product is cut into suitable lengths and placed in open racks and oven baked at about 300° F. for about 3 hours. The product, on cooling, is a compact, hard product having high chew life or unit integrity when eaten by dogs. The products of Examples 1 and 2 have a final water content of about 7% by weight, a density of about 0.7 oz./in$^3$ and a breaking force of at least 200 psi. A bar 1¼ in. × 1¼ in. × 5 in. is a complete and nutritious meal as defined by the National Research Council and is equivalent to 2 cups of dry dog food. Consumption by the dog reduces tartar on teeth.

Ten mongrel bitches were pre-conditioned for four weeks. Dogs were fed a dry dog food during this period. After this pre-conditioning period the dog's teeth were evaluated for tartar using a semi-quantitative area scoring technique. Dogs were then randomly split into two groups. One group was fed a dry dog food ad libitum and the other group was fed the compacted dog food likewise. Dogs were weighed at zero, one, two, and four weeks. Daily subjective observations were made as to the stool composition, general health and eating habits of the dogs.

In the group that was fed the compacted dog food the tartar was almost completely removed from the teeth. (95% removed).

In the control group the tartar removal was only 33% removed.

The procedure of Example 2 is carried out except that the following amounts of collagen (shredded cowhide Example A) is added to the basic composition. The percent is based on the weight of the components of Example 2:

| Example | % Collagen |
|---|---|
| 3 | 1 |
| 4 | 3 |
| 5 | 5 |
| 6 | 7.5 |
| 7 | 10.0 |
| 8 | 15.0 |
| 9 | 20.0 |
| 10 | 25.0 |

The procedure of Example 2 is carried out except that the following non-collagen fibers are employed:

| Example | Type of % Fibers |
|---|---|
| 11 | 2.5% medical grade cellulose fibers |
| 12 | 5% medical grade cellulose fibers |
| 13 | 2.5% fibrous soya derived vegetable protein |
| 14 | 5% fibrous soya derived vegetable protein |

Certain non-limiting advantages of the unitary construction of the instant invention are as follows:

(1) less space is required in that the compaction of the components occupies a smaller volume of space as compared to existing feeds; this smaller space requirement is very important in all phases of manufacturing, packaging, distribution and storage.

(2) The configuration of the unit can be designed to provide various exposed facets and angles which may be brought into play to exercise various parts of the animal's mouth, teeth and gums as well as muscles in that to chew upon the unit, depending upon the angle of positioning, various surfaces of the unit and the animal come into contact providing an infinite number of combinations of contact.

(3) The extended chew life imparted by the integrity of the unit permits the acting time of any additive or medicinal aid to be prolonged, thus, permitting more efficiency. (4) The unitary construction permits an entire meal to be used as a conditioning tool under a variety of circumstances such as in retrieving, heeling, command control such as the discipline of not eating until given permission.

(5) Product identity can be embodied in the present invention in that different manufacturers may use different configurations to differentiate their product from competitors.

(6) Component identity can be embodied in the shape or configuration imparted to denote contents and/or flavor. For example, a fish for that flavor; a triangle or other distinctive shape for a particular flavor, etc.

(7) The ecological and conservation aspects of this system are important in that the unitary construction permits the unit itself to be self-containerized eliminating in some instances the use and disposal of a metallic container. The amount of wrapping that may be used is diminished in that a smaller volume of space is used per unit of weight because of the compact nature of the invention.

While representative embodiments have been shown for the purposes of illustrating the invention, it will be apparent to those skilled in the art that various changes and modifications may be made without departing from the spirit of the invention. For example other components can be employed such as cowhide binders, etc.

The term "dry" as employed herein relates to food which is essentially dry in the food technologist sense of the term. It does not mean that all of the water is necessarily removed from the product since some foods contain water even though they would be considered dry by the food technologist. Thus, a food might contain some water combined with it and still be considered dry. In addition, instead of employing a dry food and then wetting, one may employ a pre-wetted food which is equivalent to a dry food which is later wetted.

We claim:

1. A process of preparing a hard, unit-integral, unitized, self-contained, compact chew-resistant animal food product comprising the steps of
   (1) compacting animal food of a free flowing nature and containing sufficient water to wet said animal food without affecting its free flowing nature, prior to compacting, said water being present in said animal food in an amount of at least about 7.5% by weight of the components thereof dry, said compacting being carried out at a pressure of at least about 100 psi, and
   (2) baking said so-compacted wet animal food at a temperature of at least about 200° F. for at least about 0.5 hour until said water is present in said animal food in the final amount of at least 5.5% by weight and said so-compacted animal food has a density of at least 0.5 oz/in$^3$.

2. The process of claim 1 wherein said animal food subjected to said step (1) of compacting contains structure-supporting fibers in an amount of at least 0.5% by weight of the animal food components.

3. The process of claim 1 wherein said animal food subjected to said step (1) of compacting is free from structure-supporting fibers.

4. The process of claim 2 wherein said animal food subjected to said step (1) of compacting contains
   (1) nutritional ingredients,
   (2) soya flour,
   (3) dried corn syrup and
   (4) sufficient vitamins and minerals to yield a balanced diet.

5. The process of claim 3 wherein said animal food subjected to said step (1) of compacting contains
   (1) nutritional ingredients,
   (2) soya flour,
   (3) dried corn syrup and
   (4) sufficient vitamins and minerals to yield a balanced diet.

6. The product formed by the process of claim 1.
7. The product formed by the process of claim 2.
8. The product formed by the process of claim 3.
9. The product formed by the process of claim 4.
10. The product formed by the process of claim 5.

11. A hard, unit-integral, unitized, self-contained, compact, chew-resistant nutritionally balanced animal food product having a density of at least about 0.5 oz./in.$^3$, a final water content of at least about 5.5% by weight, and a breaking force of at least about 60 psi.

12. The product of claim 11 free from structure-supporting fibers.

13. The process of claim 1 wherein the water is present in the animal food or a free flowing nature in the compacting step (1) in an amount of from about 7.5% by weight through about 20% by weight of the components thereof dry, the compacting step (1) is carried out at a pressure of from about 100 psi through about 100,000 psi, the baking step is carried out at a temperature of from about 200° F. through about 350° F. for the time of from about 0.5 hour through about 10 hours until the water is present in said animal food product in the final amount of about 5.5% by weight through about 9.5% by weight and said so-compacted animal food has a density of from about 0.5 oz./in.$^3$ through about 0.8 oz./in.$^3$.

14. The process of claim 13 wherein said animal food subjected to said step (1) of compacting contains structure-supporting fibers in an amount of from about 0.5% through about 40% by weight of the animal food.

15. The process of claim 13 wherein said animal food subjected to said step (1) of compacting is free from structure-supporting fibers.

16. The process of claim 14 wherein said animal food subjected to said step (1) of compacting contains (1) nutritional ingredients, (2) soya flour, (3) dried corn syrup and (4) sufficient vitamins and minerals to yield a balanced diet.

17. The process of claim 15 wherein said animal food subjected to said step (1) of compacting contains (1) nutritional ingredients, (2) soya flour, (3) dried corn syrup and (4) sufficient vitamins and minerals to yield a balanced diet.

18. The product formed by the process of claim 13.
19. The product formed by the process of claim 14.
20. The product formed by the process of claim 15.
21. The product formed by the process of claim 16.
22. The product formed by the process of claim 17.

23. The product of claim 11 having a density of from about 0.5 oz./in.$^3$ through about 0.8 oz./in.$^3$, a final water content of from about 5.5% by weight through about 9.5% by weight and a breaking force of from about 60 psi through about 800 psi.

24. The product of claim 23 free from structure-supporting fibers.

* * * * *

UNITED STATES PATENT AND TRADEMARK OFFICE
CERTIFICATE OF CORRECTION

PATENT NO. : 4,145,447
DATED : March 20, 1979
INVENTOR(S) : Stanton E. Fisher and Bernard W. Weinrich It is certified that error appears in the above-identified patent and that said Letters Patent are hereby corrected as shown below:

Column 5, In EXAMPLE 1, after the first full paragraph, the line "* The ingredients have the following analysis:" is removed and reinserted after the third full paragraph (after the word "dogs.")

Column 5, In EXAMPLE 2, after the first full paragraph, the line "** The supplement employed had the following vitamin content:" is removed and reinserted after the second full paragraph (after "1,000 psi.")

Signed and Sealed this

Twenty-ninth Day of May 1979

[SEAL]

Attest:

RUTH C. MASON
Attesting Officer

DONALD W. BANNER
Commissioner of Patents and Trademarks